Nov. 26, 1963  N. E. B. LARSSON  3,112,063
VALVE FOR MACHINES HAVING A RECIPROCATING PISTON
Filed March 23, 1959  3 Sheets-Sheet 1
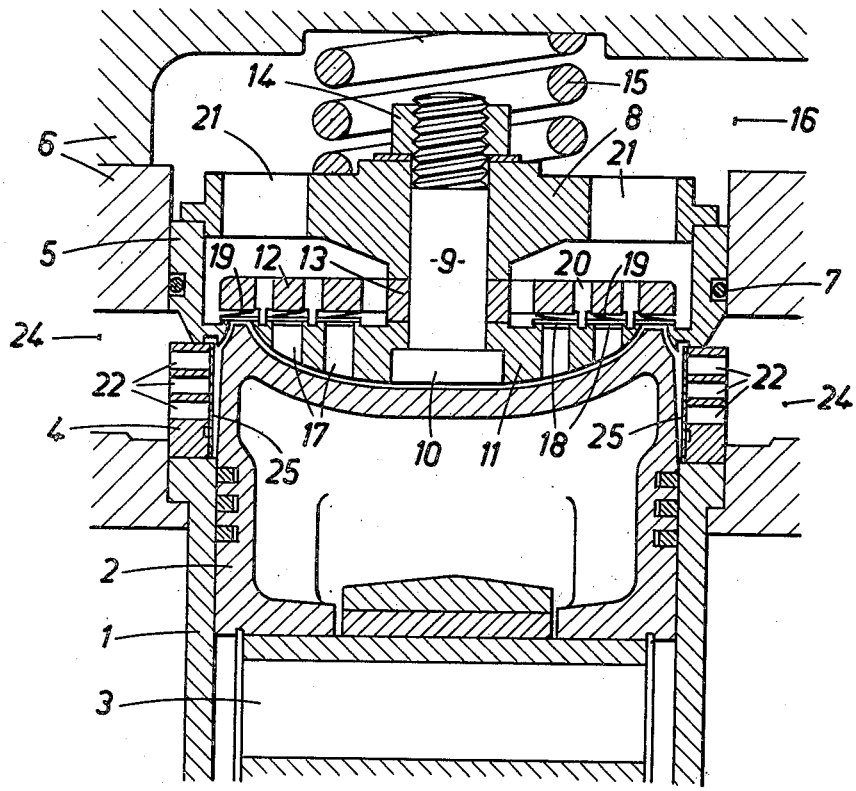
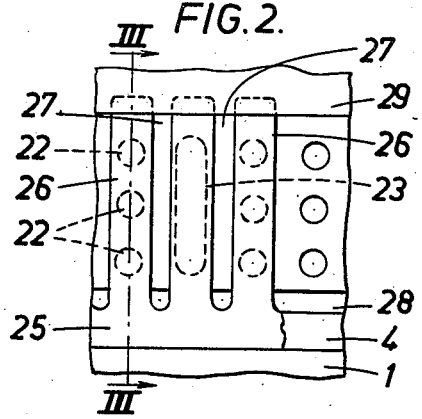 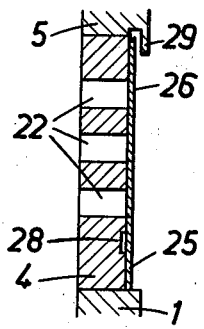
Inventor
Nils E. B. Larsson
by Sommers & Young
Attorneys

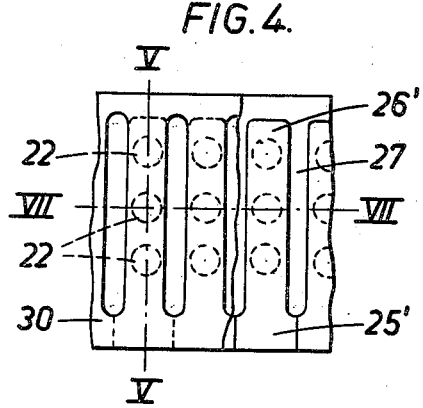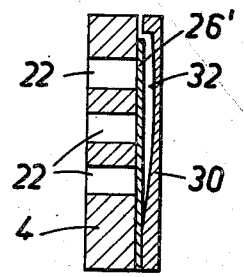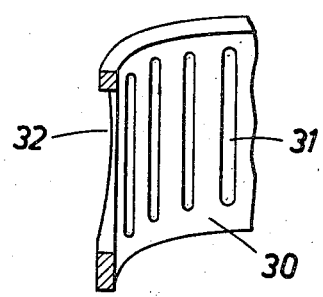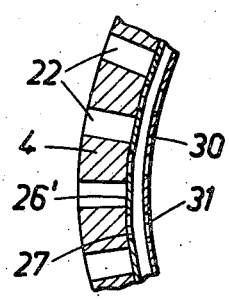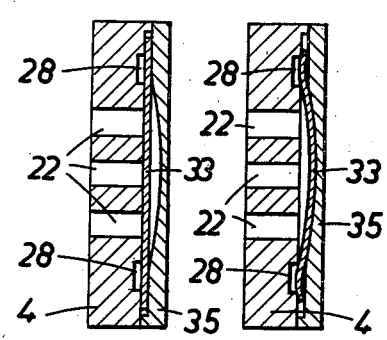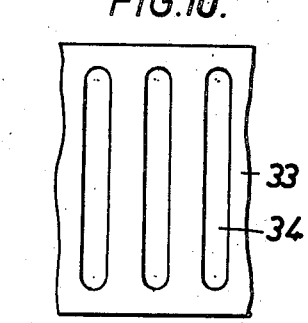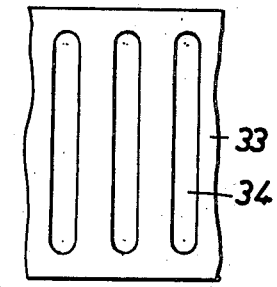

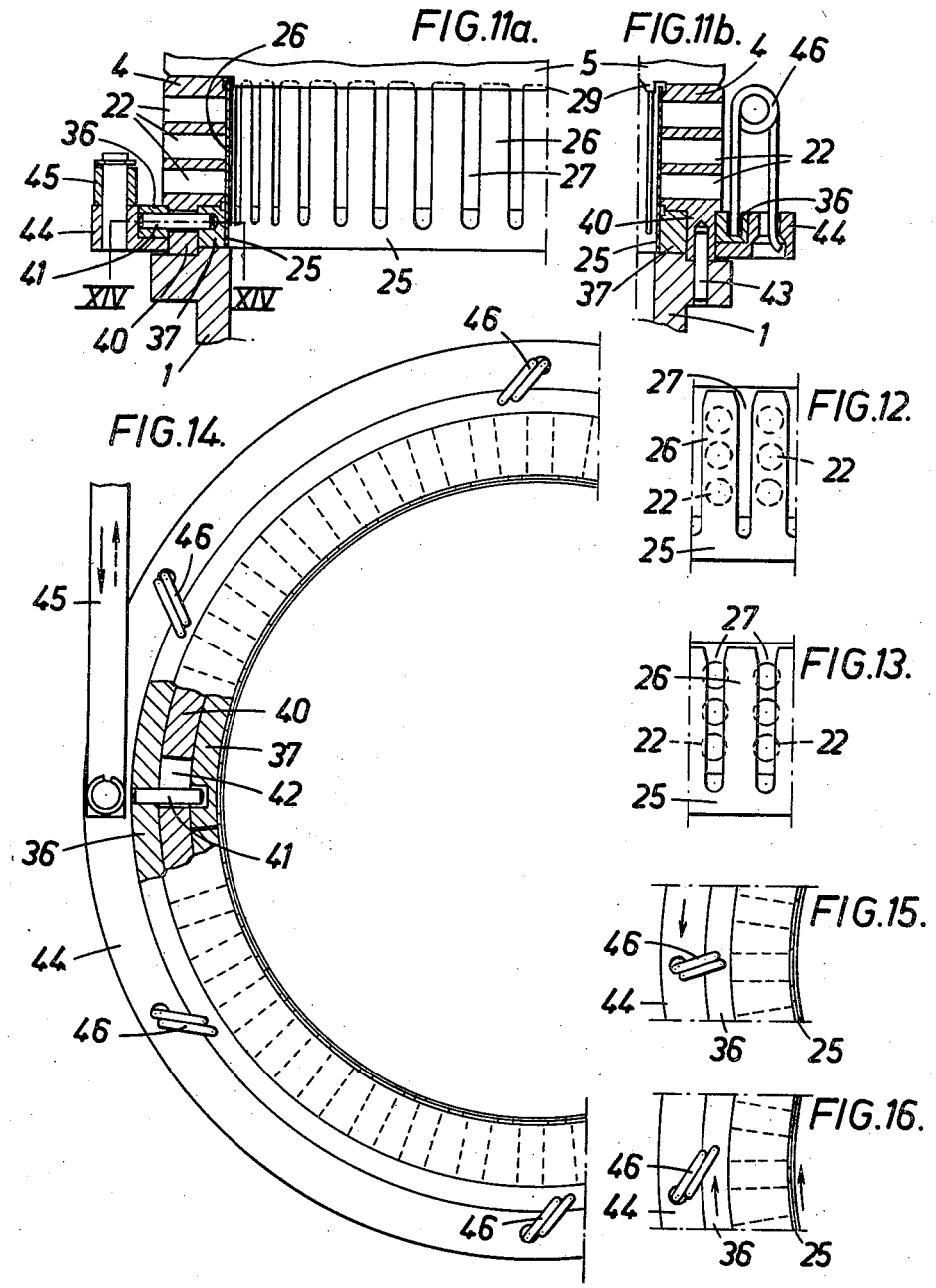

United States Patent Office 3,112,063
Patented Nov. 26, 1963

3,112,063
VALVE FOR MACHINES HAVING A RECIPROCATING PISTON
Nils Erik Birger Larsson, Sodermalmsvagen 11, Finspang, Sweden
Filed Mar. 23, 1959, Ser. No. 801,232
Claims priority, application Sweden Mar. 29, 1958
6 Claims. (Cl. 230—229)

The present invention relates to a valve for machines having a reciprocating piston and more particularly a valve mechanism which may be used as intake or discharge valve for compressors and similar machines.

An object of the invention is to provide a valve for said purpose which allows reduction of the harmful space to a minimum.

Another object of the invention is to provide a valve which may afford a large area of passage and which, due to a reduced mass of its movable members, may open and close very rapidly, thereby rendering the valve especially suitable for speedy machines.

Still another purpose of the invention which has special reference to its use in combination with compressors is to provide a valve which allows regulation of the capacity of the compressor without changing the speed of operation thereof.

The invention is characterized, chiefly, by the provision of a combined valve housing and seat, hereinafter referred to as seat, in the shape of a substantially annular extension of the cylinder wall of the machine, thereby allowing the piston to pass up thereinto, said seat having peripherally spaced, substantially radially extending openings for the passage of the working medium which are controlled by automatically operable blade like valve bodies liftable from the seat in a substantially radial direction with relation to the axis of the cylinder for uncovering said openings, stops being provided for limiting said lifting movement.

Another feature of the invention resides in mounting the valve body and the valve seat rotatably with relation to each other for the purpose of unloading the machine by moving the valve body out of the range of the openings of the seat, thereby completely uncovering them.

The above stated and other objects and features of the invention will more clearly appear from the specification hereinafter to follow, reference being had to the accompanying drawings in which the invention is illustrated in several embodiments, all of which by way of example are applied to a piston type of compressor. It is to be noted, however, that the invention is not limited to the use at such machines but may be applied to various kinds of machines having a reciprocating piston.

In the drawings, FIG. 1 is an axial section of the piston and the uppermost portion of a compressor having a valve mechanism according to an embodiment of the invention. FIG. 2 is an elevation of a portion of the valve mechanism looking from the inside of the cylinder. FIG. 3 is a section taken on the line III—III of FIG. 2.

FIG. 4 is an elevation, looking from inside the cylinder, of a portion of a modified embodiment of the valve mechanism, with a portion of an innermost member thereof broken away, FIG. 5 is an axial section taken on the line V—V of FIG. 4, FIG. 6 is a perspective detail view of the valve mechanism shown in FIGS. 4 and 5, and FIG. 7 is a cross section on the line VII—VII of FIG. 4.

FIGS. 8 and 9 are axial sections of a further modified embodiment of the valve mechanism shown in closed and open state, respectively, and FIG. 10 is an elevation of a portion of the valve body of this embodiment.

FIGS. 11a and 11b are diametrically opposite portions of an axial section of a valve mechanism of a still modified embodiment of the invention used as intake valve for a compressor cylinder. FIGS. 12 and 13 are elevations looking from inside of a portion of said valve mechanism with the valve seat and the valve body shown in two different positions with relation to each other. FIG. 14 is a top plan view of the embodiment shown in FIG. 11 with certain portions shown in horizontal section FIGS. 15 and 16 are top plan views of a detail portion of FIG. 14 with the valve body shown in different positions.

It is to be noted that in the description hereinafter to follow the same reference numerals denote similar parts in all embodiments described.

With reference to FIG. 1, the numeral 1 designates the cylinder wall of a piston type of compressor, 2 is the up and down movable piston thereof, and 3 is a pivot for hingedly connecting a piston rod, not shown, to the piston 2. Supported on the top edge of the cylinder wall 1 is an annular member 4 forming an extension of the cylinder wall 1. Said member 4 is constructed and arranged in a manner to be hereinafter set forth to act as the seat of a valve mechanism for admitting to the cylinder the medium to be compressed therein by the action of the piston, said medium being hereinafter referred to as the working medium.

Resting on the top edge of the seat member 4 is an annular member 5 forming the top portion of the cylinder wall. Said annular member 5 is fitted in a boring in the compressor frame designated as a whole by 6 and is tightened therein by means of a sealing ring 7. Resting on the top edge of the wall member 5 is a yoke 8 which supports by means of a central bolt 9 and its head 10 a cylinder cover 11 having, in the embodiment shown, a curved lower surface and a plane upper surface. Clamped between the cylinder cover and the yoke is a flat disc 12 having a downwardly extended hub portion 13 surrounding the bolt. Said extended hub portion bears upon the cover 11 so as thereby to maintain the disc 12 at a distance above the plane upper surface of the cylinder cover.

The cylinder cover 11, the disc 12 and the yoke 8 are all clamped together in the longitudinal direction of the bolt by means of a nut 14 engaging the threaded upper end of the bolt. A pressure spring 15 is inserted between the yoke and the upper wall of a discharge chamber 16 in the compressor frame for a purpose well-known per se. Formed in the cylinder cover 11 are sets of channels 17 through which the working medium compressed by the action of the piston 2 may be discharged. Said discharge channels are controlled by valves 18 loaded by springs 19 inserted between the valves and the lower surface of disc 12. Formed in the disc 12 are openings 20 through which the medium that has passed from the channels 17 past the valves 18 in their lifted state may further pass into the discharge chamber 16 via openings 21 in the yoke 8.

As thus far described the structure is well known except for the admission valve mechanism of which the seat member 4 forms a part.

The annular valve seat member 4 is formed with peripherally spaced axial rows of apertures 22, see also FIGS. 2 and 3, or axially elongate ports, as indicated at 23 in FIG. 2. Said apertures or ports communicate at the external periphery of member 4 with a working medium admission channel formed in the compression frame, as indicated at 24 in FIG. 1.

Bearing against the internal cylindrical surface of the annular member 4 is a valve body formed by an annularly bent flexible metallic strip 25 extending axially in the direction of movement of the piston in its exhaust stroke and having peripherally spaced oblong valve blades, or tongues 26 cut therein, each one of said tongues being in register with one row of apertures 22, or each port 23, respectively, as will appear from FIG. 2.

The operation of the valve body 25 is, principally, such that the oblong valve blades or tongues 26 which normally cover the apertures 22 or ports 23 in the seat member 4 may bend themselves inwardly so as to uncover said apertures or ports, as the piston moves downwardly, thereby reducing the pressure inside the cylinder. The working medium supplied through the channel 24 which fills the apertures 22 or ports 23 is thus allowed to pass into the cylinder via the spaces 27 between the tongues.

To facilitate said inward bending of the tongues 26 an annular groove 28 is formed in the inner circumference of the seat member 4 in register with the base portions of the tongues, as seen in FIGS. 2 and 3. When the upper ends of the tongues are bent inwardly there will appear a tendency of the base portions of the tongues to bend outwardly where they are connected to the body 25. The groove 28 serves to receive these outwardly curved portions. To limit the inward movement of the upper ends of the tongues the uppermost cylinder wall member 5 is formed with an annular projection 29 extending downwardly beyond the upper ends of the tongues 26 at the inside thereof, see FIGS. 2 and 3, so as to act as a stop therefor.

The intake valve mechanism shown in FIGS. 4 to 7 includes a seat member 4 having a polygonally shaped inner peripheral surface instead of a circularly cylindrical one, as will be seen from an inspection of FIG. 7. In the example shown three axially spaced apertures 22 open in each plane surface of said polygonal periphery. In the example shown the valve body comprises a set of separate flat tongues 26' of a shape similar to that of the tongues 26 of the embodiment already described. The tongues 26' are formed with widened base portions 25' abutting against each other so as to give rise to the formation of spaces 27 between the individual tongues 26', corresponding to the equally designated spaces of the first embodiment. The tongues 26' are held in place by being clamped to the seat member 4 by means of ring 30 formed with axially extending slots 31 in register with the spaces 27. The surface of ring 30 facing the tongues 26' is formed with a cup shaped annular recess 32, FIGS. 5 and 6, for allowing a limited inward bending of the tongues during the down stroke of the piston.

In the embodiment shown in FIGS. 8 to 10 the valve body comprises annularly bent strip 33 having peripherally spaced axially extending slots 34 formed therein. Said annular strip 33 is placed between the circularly cylindrical internal surface of the seat member 4 and a ring 35 of such a shape as to lock the upper and lower portions of the strip 33 against radial movements with relation to the seat member 4 while allowing axial movements thereof when the strip is subjected to bending stresses during the down stroke of the piston. To allow the inward bending of the strip 33 the ring 35 is formed with a cup shaped recess on its surface facing the strip 33 similarly as in the ring 30 of the embodiment shown in FIGS. 4 to 7. To facilitate the inward bending of the strip 33 the seat member 4 of this embodiment is formed with an upper and a lower annular groove 28 for receiving the outward bends of the annular strip appearing abreast of the upper and lower ends of the slots 34 when the middle portion of the strip is bent inwardly into contact with the adjacent cup shaped surface of ring 35, as indicated in FIG. 9.

It is to be noted that the coherent annular strip 33 of this embodiment may be replaced by a number of separate axial strips.

In the embodiment shown in FIGS. 11a to 16 the valve seat member 4 is formed with a circularly cylindrical internal surface for cooperation with the valve body. The seat member is shown as formed with peripherally spaced axial rows of apertures 22 but may, of course, be formed with axially elongate ports, similar to port 23 of FIG. 2. The valve body comprises a unitary annularly bent strip 25 having axially extending tongues 26 cut therein with spaces 27 therebetween. Said tongues are normally located in register with the rows of apertures 22 and act in uncovering them in the same way as already described in connection with the description of the embodiment of FIGS. 1 to 3. As in said embodiment the inward or uncovering bending movement of the tongues are limited by a stop formed by an annular projection 29 of an uppermost cylinder wall member 5.

In order to effect a capacity regulation the apertures 22 may be completely uncovered by bringing the tongues 26 out of register with the rows of apertures 22. To this end the valve body 25 is rotatably mounted with relation to the valve seat member 4. For effecting a rotation of the valve body within predetermined limits is shown a snap by means of which such a rotation may be rapidly carried out during the suction stroke of the piston, since during this stroke the rotation is facilitated due to the tongues not being forced against the valve seat.

The turning mechanism comprises two concentric rings 36 and 37 situated on opposite sides of the lowermost portion of the seat member 4, said portion which is designated by the reference numeral 40 in FIGS. 11a and 11b being of a small radial width with relation to the radial width of the remaining portion of the seat member. Said rings 36 and 37 are connected together by means of a substantially radial pin 41 passing freely through a circumferentially elongate opening 42 formed in the seat portion 40.

Thus, by turning the ring 36 which is accessible from outside the inner ring 37 as well as the valve body 25 connected thereto may be rotated from the position shown in FIG. 12 into the position shown in FIG. 13 and back again. In order to prevent the valve seat member 4 from partaking in this rotation it is locked to the cylinder wall 1 by means of a substantially axial pin 43, FIG. 11b.

The valve body 25 and the inner control ring 37 therefor are split like piston rings in order to permit expansion due to increase of temperature.

The quick rotary movement of rings 36 and 37 may be effected by means of a ring 44 rotatably surrounding the ring 36 while bearing also against the lower surface thereof, as shown in FIGS. 11a and 11b. Said ring 44 may be rotated by means of an arm 45 connected, for instance, to a hydraulic controlling device, not shown. Inserted between the rings 36 and 44 at circumferentially spaced points thereof are spirally wound springs 46 the ends of which engage holes formed in the ring 36 and the ring 44, respectively.

To effect setting of the valve body 25 into the inoperative position indicated in FIG. 13 the arm 45 is subjected to a power acting in the direction of the full arrow shown in FIG. 14. The resulting rotary movement of ring 44 puts the springs 46 under tension and, after reaching the position shown in FIG. 15, the springs are released during the suction stroke of the piston operating in the cylinder and moves the ring 36 quickly in clockwise direction to the position shown in FIG. 16 corresponding to the position of the valve body shown in FIG. 13 in which the rows of apertures are in register with the spaces 27. To restore the valve body to normal position with the tongues 26 in register with the rows of apertures the arm 45 is moved in the direction of the dotted arrow in FIG. 14, causing the ring 44 to again tension the springs 46 and allow them to restore the rings 36 and 37 with the valve body to normal position.

Other quickly operating shifting device than that above described may be used without departing from the idea or scope of the invention.

Among further modifications is to be mentioned that the valve body may be stationary and the valve seat member rotatably mounted.

While hereinbefore the invention is described as applied to an intake valve it may be applied to a discharge valve for a machine having a reciprocating piston. In such case the valve body should be mounted to cooperate with the external surface of the seat member.

The invention is, of course, not restricted to compressors but may be used in connection with any kind of machines having a reciprocating piston.

I claim:

1. A suction valve mechanism for machines of the type including a cylinder wall and a reciprocating piston therein, comprising an annular apertured valve seat member forming an axial extension of the cylinder wall so as to allow the piston to enter thereinto, said valve seat member comprising a ring having peripherally spaced openings extending substantially radially therethrough, the seating surface of said seat member being coaxial with the inner cylinder surface but situated at a larger radial distance from the axis of the cylinder than said cylinder surface so as to leave an annular space between itself and the piston in the uppermost position thereof, an annular cylindrical valve member located in said space, said valve member including oblong valve blades, said valve blades being mounted at their ends remote from the corresponding end of the cylinder and extending freely in the direction of movement of the piston in its exhaust stroke and which are capable of being lifted from said seating surface substantially radially inwards and an annular stop for limiting said inward movement of said blades.

2. In a valve mechanism as claimed in claim 1 the feature that the valve blades for controlling the flow of working medium through the openings of the seat member comprise peripherally spaced, substantially rectangularly shaped separate strips of flexible material held at their one ends against a peripheral surface of the seat member while being free to move by their other ends from and to the seat member and the openings therein, a clamping ring being provided to hold the first mentioned ends of the strips in position, said clamping ring having openings in register with the spaces between the strips and being shaped to act as a means for limiting the movement of the free portions of the strips away from the seat member.

3. In a valve mechanism as claimed in claim 1 the feature that said annular valve member comprises an annularly bent strip of flexible material having a set of peripherally spaced, substantially rectangular openings cut therein and so mounted as to allow said oblong valve blades remaining between said openings to act as flexible valve bodies for the peripherally spaced openings of the valve seat member.

4. In a valve mechanism as claimed in claim 1, and in which the means for controlling the flow of working medium through the openings of the seat member comprise peripherally spaced flexible tongues cut out of an annular strip of flexible material held to a peripheral surface of the seat member along its base edge by means of a clamping ring, the feature that the said seat member is formed with an annular groove in register with the base portions of the tongues so as to allow a bending of the annular strip towards the seat member at the transition between it and the tongues due to a bending of the free ends of the tongues away from the seat member, the clamping ring being shaped to limit the bending of the tongues.

5. In a valve mechanism as claimed in claim 1, and in which said annular valve member comprises an annularly bent strip of flexible material having a set of peripherally spaced, substantially rectangular openings cut therein and mounted with said rectangular openings angularly between said valve body opening so as to allow said oblong valve blades remaining between said rectangular openings to act as flexible valve bodies for the peripherally spaced openings of the valve seat member, and in which the seat member is formed with annular grooves in register with the opposite ends of the openings in said strip so as to allow bending of the annular strip towards the seat member at the transitions between the rib-like portions and the edge portions of the rib upon a bending of said oblong valve blades away from the seat member, means being provided to guide the annular strip during said bending and limit the extent of the bending.

6. In a valve mechanism as claimed in claim 1 the further feature that the blades of the valve member comprise peripherally spaced axially extending tongues of an annularly bent strip of flexible material, said strip being held by one edge portion cohering with the tongues against a peripheral surface of the seat member with the tongues in register with the peripherally spaced openings therein.

References Cited in the file of this patent

UNITED STATES PATENTS

| | | |
|---|---|---|
| 1,633,692 | Clapp | June 28, 1927 |
| 2,091,907 | Blom | Aug. 31, 1937 |
| 2,576,946 | LaCroix | Dec. 4, 1951 |
| 2,657,899 | Kohler | Nov. 3, 1953 |
| 2,728,351 | Cooper | Dec. 27, 1955 |
| 2,798,505 | Kehler | July 9, 1957 |

FOREIGN PATENTS

| | | |
|---|---|---|
| 9,274 | Great Britain | Apr. 24, 1903 |
| 73,201 | Austria | Aug. 15, 1916 |
| 371,688 | Great Britain | Apr. 28, 1932 |
| 382,198 | Great Britain | Oct. 20, 1932 |